US011593192B2

(12) United States Patent
Kandasamy et al.

(10) Patent No.: US 11,593,192 B2
(45) Date of Patent: Feb. 28, 2023

(54) DETECTING RESOURCE REDUNDANCY AND CONFLICTS IN A HETEROGENEOUS COMPUTING ENVIRONMENT

(71) Applicant: International Business Machines Corporation, Armonk, NY (US)

(72) Inventors: Malarvizhi Kandasamy, Bengaluru (IN); Sudheesh S. Kairali, Kerala (IN); Amitabha Biswas, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 17/302,943

(22) Filed: May 17, 2021

(65) Prior Publication Data

US 2022/0365835 A1 Nov. 17, 2022

(51) Int. Cl.
*G06F 11/00* (2006.01)
*G06F 11/07* (2006.01)
(Continued)

(52) U.S. Cl.
CPC .......... *G06F 11/079* (2013.01); *G06F 9/5027* (2013.01); *G06F 11/0709* (2013.01);
(Continued)

(58) Field of Classification Search
CPC ............. G06F 11/0703; G06F 11/0706; G06F 11/0709; G06F 11/0751; G06F 11/0754;
(Continued)

(56) References Cited

U.S. PATENT DOCUMENTS 6,847,970 B2 * 1/2005 Keller .................... G06F 11/008
7,096,459 B2 * 8/2006 Keller ................. G06F 11/0709 717/124

(Continued)

FOREIGN PATENT DOCUMENTS

CN 109254865 A 1/2019
CN 109643255 A 4/2019

OTHER PUBLICATIONS

PCT International Search Report and Written Opinion, dated Aug. 18, 2022, regarding Application No. PCT/CN2022/093049, 10 pages.
Yao et al., "Bottleneck Detection and Solution Recommendation for Cloud-Based Multi-Tier Application," IEEE International Conference on Service Oriented Computing, Nov. 2014, 16 pages. https://www.researchgate.net/publication/280944233.

(Continued)

*Primary Examiner* — Anthony J Amoroso
(74) *Attorney, Agent, or Firm* — Yee & Associates, P.C.

(57) ABSTRACT

Detecting resource errors in a heterogeneous computing environment is provided. A plurality of individual resource dependency graphs corresponding to a plurality of computing systems that comprise the heterogeneous computing environment is consolidated to form a consolidated resource dependency graph. An analysis of respective nodes representing respective resources of the heterogeneous computing environment in the consolidated resource dependency graph is performed to identify a resource error caused by a new resource being added to a computing system of the plurality of computing systems based on defined rule sets. It is determined whether the new resource causes an error to sibling resources at a same level under a parent resource in the consolidated resource dependency graph based on the analysis. In response to determining that the new resource does not cause an error to the sibling resources, the new resource is deployed in the computing system of the heterogeneous computing environment.

20 Claims, 12 Drawing Sheets

MULTI-CLOUD RESOURCE MANAGEMENT SYSTEM 500
MULTI-CLOUD RESOURCE MANAGEMENT SERVER 502
INDIVIDUAL CLOUD RESOURCE DEPENDENCY GRAPH 518
USER 506
510 SMART MULTI-CLOUD RESOURCE DEPLOYER
514 MULTI-CLOUD RESOURCE DEPENDENCY GRAPH MANAGER
516
CLOUD1 520
CLOUD PROVIDER1
522
508 SOFTWARE CONFIGURATION FILE
CONSOLIDATED MULTI-CLOUD RESOURCE DEPENDENCY GRAPH
512 MULTI-CLOUD RESOURCE MANAGER
INDIVIDUAL CLOUD RESOURCE DEPENDENCY GRAPH 524
CLIENT DEVICE 504
USER RULES
536 REDUNDANCY CHECKER
CLOUD2 526
CLOUD PROVIDER2
528
532 RULE ELEVATOR
MULTI-CLOUD RESOURCE DEPLOYMENT ERROR ANALYZER 530
CONFLICT CHECKER 538
540
CLOUD PROVIDER RULES 534

(51) Int. Cl.
*G06F 9/50* (2006.01)
*G06F 11/22* (2006.01)

(52) U.S. Cl.
CPC ...... *G06F 11/0751* (2013.01); *G06F 11/0793* (2013.01); *G06F 11/2289* (2013.01)

(58) Field of Classification Search
CPC ............... G06F 11/079; G06F 11/0793; G06F 11/2247; G06F 11/2289; G06F 9/50; G06F 9/5005; G06F 9/5027; G06F 9/5044; G06F 9/505; G06F 9/5055; G06F 2201/81
See application file for complete search history.

(56) References Cited

U.S. PATENT DOCUMENTS

| | | | | |
|---|---|---|---|---|
| 7,240,325 | B2 * | 7/2007 | Keller | G06F 9/5061 717/121 |
| 7,334,222 | B2 * | 2/2008 | Keller | H04L 43/091 717/135 |
| 7,505,872 | B2 * | 3/2009 | Keller | G06F 11/0709 702/186 |
| 8,738,961 | B2 | 5/2014 | Jain et al. | |
| 9,697,045 | B2 | 7/2017 | Amaral et al. | |
| 10,230,582 | B2 | 3/2019 | Billore et al. | |
| 10,599,551 | B2 | 3/2020 | Lu et al. | |
| 2004/0046785 | A1 * | 3/2004 | Keller | H04L 41/5054 715/734 |
| 2004/0049365 | A1 * | 3/2004 | Keller | G06F 11/0709 714/E11.026 |
| 2004/0049372 | A1 * | 3/2004 | Keller | H04L 43/091 703/22 |
| 2004/0049509 | A1 * | 3/2004 | Keller | G06F 11/008 |
| 2004/0049565 | A1 * | 3/2004 | Keller | G06F 11/0709 714/E11.027 |
| 2015/0278272 | A1 | 10/2015 | Cai et al. | |
| 2017/0288952 | A1 | 10/2017 | Clark et al. | |
| 2018/0062953 | A1 * | 3/2018 | Billore | H04L 41/0893 |
| 2020/0026633 | A1 | 1/2020 | Gottin et al. | |

OTHER PUBLICATIONS

Ebbers, “Cloud Computing: Save Time, Money, and Resources with a Private Test Cloud,” RedBooks, Oct. 26, 2009, IBM Corporation, 22 pages. http://www.redbooks.ibm.com/redpapers/pds/redp4553.pdf.

Benn, “Cloud High Availability: how to select the right technologies,” Service Engineering (ICCLab & SPLab), A Blog of the ZHAW Zurich University of Applied Sciences, 34 pages. https://blog.zhaw.ch/icclab/tag/dependability/.

Albouyeh et al., “Introducing IBM Cloud Platform Metrics,” IBM Cloud platform monitoring with Sysdig—Unified metrics for infrastructure, applications, and now, IBM services, IBM Corporation, Mar. 24, 2020, Accessed May 10, 2021, 9 pages. https://www.IBM.com/cloud/blog/announcements/IBM-cloud-platform-metrics.

Goncalves et al., “Resource allocation based on redundancy models for high availability cloud,” Published May 21, 2019, Computing, Issue 102, 2020, 21 pages. https://link.springer.eom/article/10.1007/s00607-019-00728-1.

“Networking is Complex in Multicloud Environments,” Multi-Cloud & Multi-Region VPC Peering Management, Aviatrix Systems, Inc., Copyright 2021, Accessed May 10, 2021, 5 pages. https://a.aviatrix.com/solutions/multicloud-peering.php.

Mell et al., “The NIST Definition of Cloud Computing,” Computer Security Division, National Institute of Standards and Technology, Jan. 2011, 7 pages.

“Identifying redundant edges in a dependency graph,” Business Intelligence, Sep. 22, 2015, Copyright 2019 Christian Stade-Schuldt, 4 pages. https://blog.tafkas.net/2015/09/22/identifying-redundant-edges-in-a-dependency-graph/.

“Equals() and hashCode() methods in Java,” GeeksforGeeks, Oct. 11, 2019, Accessed May 17, 2021, 8 pages. https://www.geeksforgeeks.org/equals-hashcode-methods-java/.

“Planning for IBM Cloud Transit Gateway,” IBM Corporation, Updated Apr. 9, 2021, Accessed May 17, 2021, 6 pages. https://cloud.ibm.com/docs/transit-gateway?topic=transit-gateway-helpful-tips.

“BlastRadius,” GitHub, Inc., Copyright 2021, Accessed May 17, 2021, 5 pages. https://github.com/28mm/blast-radius.

* cited by examiner

OUTBOUND SECURITY RULES TABLE 700

| | PRIORITY | NAME | PORT | PROTOCOL | SOURCE | DESTINATION | ACTION |
|---|---|---|---|---|---|---|---|
| 702 | 65000 | AllowAllOutBound | ANY | ANY | ANY | ANY | ALLOW |
| 704 | 65001 | AllowInternetOutBound | ANY | ANY | ANY | INTERNET | ALLOW |
| 706 | 65000 | DenyAllOutBound | ANY | ANY | ANY | ANY | DENY |

FIG. 7

RESOURCE DEPENDENCY TABLE 800

| SERIAL NO. | RESOURCE NAME/ID | DEPENDENT RESOURCE NAME/ID | REDUNDANCY (0=NO, 1=YES, 3=CONFLICT) | COST INCURRED (IN DOLLARS) |
|---|---|---|---|---|
| 1 | test_tg_gateway_1 | test_tg_connection | 0 | 100 |
| 2 | test_tg_gateway_1 | test_com_tg_connection | 0 | 100 |
| 3 | test_tg_gateway_1 | test_com_tg_xac | 1 | 300 |
| 4 | test_tg_gateway_1 | test_com_tg_xac1 | 1 | 300 |

DESIRABLE RESOURCE REDUNDANCY TABLE
900

| SERIAL NO. | RESOURCE TYPE 904 | REDUNDANCY DESIRED (1=DESIRED, 0=UNDESIRED) | PRIORITY ORDER |
|---|---|---|---|
| 1 | com_tg_gateway | 1 | 1 |
| 2 | com_tg_connection | 1 | 2 |
| 3 | com_is_security_group | 0 | 2 |
| 4 | com_is_security_group_rule | 0 | 1 |
| 5 | com_is_instance | 1 | 3 |
| 6 | com_is_vpc | 1 | 4 |

DETECTING RESOURCE REDUNDANCY AND CONFLICTS IN A HETEROGENEOUS COMPUTING ENVIRONMENT

BACKGROUND

1. Field

The disclosure relates generally to multi-cloud infrastructures and more specifically to detecting resource redundancy and conflict errors in a multi-cloud infrastructure comprised of a plurality of clouds corresponding to different cloud providers using a single consolidated multi-cloud resource dependency graph.

2. Description of the Related Art

Multi-cloud is utilization of multiple cloud services, such as, for example, computing, storage, and the like, in a single heterogeneous cloud architecture. Multi-cloud also refers to distribution of resources or assets, such as, for example, software applications, programs, and the like, across multiple cloud-hosting environments. With a typical multi-cloud infrastructure utilizing two or more clouds, such as, for example, public clouds, private clouds, hybrid clouds, or the like, a multi-cloud infrastructure tries to eliminate reliance on any single cloud provider. Multi-cloud differs from hybrid cloud in that multi-cloud refers to multiple cloud services rather than multiple cloud deployment models (e.g., public, private, and hybrid). Also, in a multi-cloud infrastructure, synchronization between different providers is not essential to complete processing or a transaction. For example, an entity, such as, for example, an enterprise, company, business, organization, institution, agency, or the like, may concurrently use different cloud providers for infrastructure, platform, and software services. Similarly, an entity may utilize different cloud providers for different workloads or may deploy a single workload load balanced across multiple providers.

SUMMARY

According to one illustrative embodiment, a computer-implemented method for detecting resource errors in a heterogeneous computing environment is provided. A computer consolidates a plurality of individual resource dependency graphs corresponding to a plurality of computing systems that comprise the heterogeneous computing environment to form a consolidated resource dependency graph of the heterogeneous computing environment. The computer performs an analysis of respective nodes representing respective resources of the heterogeneous computing environment in the consolidated resource dependency graph to identify a resource error caused by a new resource being added to a computing system of the plurality of computing systems that comprise the heterogeneous computing environment based on defined rule sets for the plurality of computing systems. The computer determines whether the new resource causes a resource error to a set of sibling resources at a same level under a parent resource in the consolidated resource dependency graph based on the analysis. In response to the computer determining that the new resource does not cause a resource error to the set of sibling resources at the same level under the parent resource in the consolidated resource dependency graph based on the analysis, the computer deploys the new resource in the computing system of the heterogeneous computing environment. According to other illustrative embodiments, a computer system and computer program product for detecting resource errors in a heterogeneous computing environment are provided.

BRIEF DESCRIPTION OF THE DRAWINGS

FIG. 7 is a diagram illustrating an example of an outbound security rules table in accordance with an illustrative embodiment;

FIG. 8 is a diagram illustrating an example of a resource dependency table in accordance with an illustrative embodiment;

FIG. 9 is a diagram illustrating an example of a desirable resource redundancy table in accordance with an illustrative embodiment;

DETAILED DESCRIPTION

Figure 1:
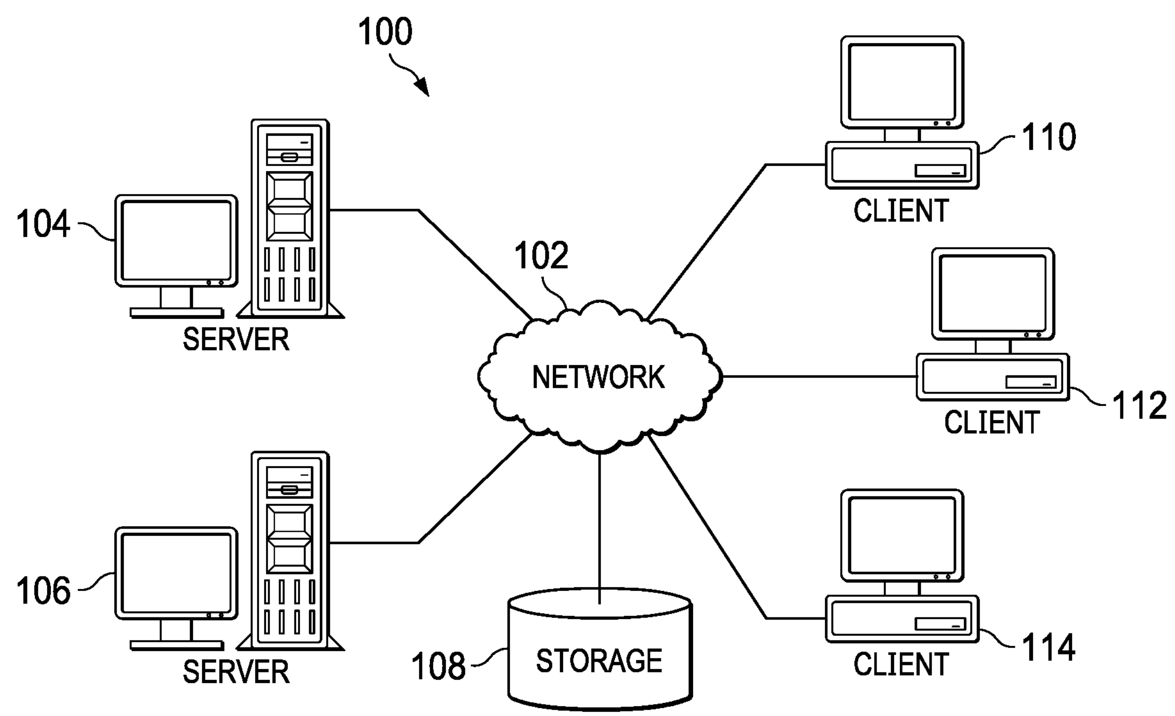
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide multi-cloud resource management services by detecting resource errors, such as, for example, resource redundancy errors, resource conflict errors, and the like, in a multi-cloud infrastructure comprised of a plurality of clouds corresponding to different cloud providers using a single consolidated multi-cloud resource dependency graph and a set of rules. Upon detecting resource errors in the multi-cloud architecture, server 104 and server 106 can take automatic action to remove or correct the detected resource errors and/or notify an infrastructure administrator of the detected resource errors. Also, it should be noted that server 104 and server 106 may each represent multiple computing nodes in one or more cloud environments. Alternatively, server 104 and server 106 may each represent a cluster of servers in one or more data centers.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users, such as, for example, software development and information technology operations (DevOps) administrators, infrastructure administrators, and the like, corresponding to clients 110, 112, and 114 may utilize clients 110, 112, and 114 to access and utilize the multi-cloud resource management services provided by server 104 and server 106.

Storage 108 is a network storage device capable of storing any type of data in a structured format or an unstructured format. In addition, storage 108 may represent a plurality of network storage devices. Further, storage 108 may store cloud identifiers, resource identifiers, identifiers and network addresses for a plurality of networks, identifiers and network addresses for a plurality of servers, cloud resource dependency graphs, consolidated multi-cloud resource dependency graphs, user-provided rules, cloud provider-provided rules, resource error tables, resource redundancy desirability tables, identifiers and network addresses for a plurality of client devices, identifiers for a plurality of users, and the like. Furthermore, storage 108 may store other types of data, such as authentication or credential data that may include usernames, passwords, and biometric data associated with administrators and users, for example.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
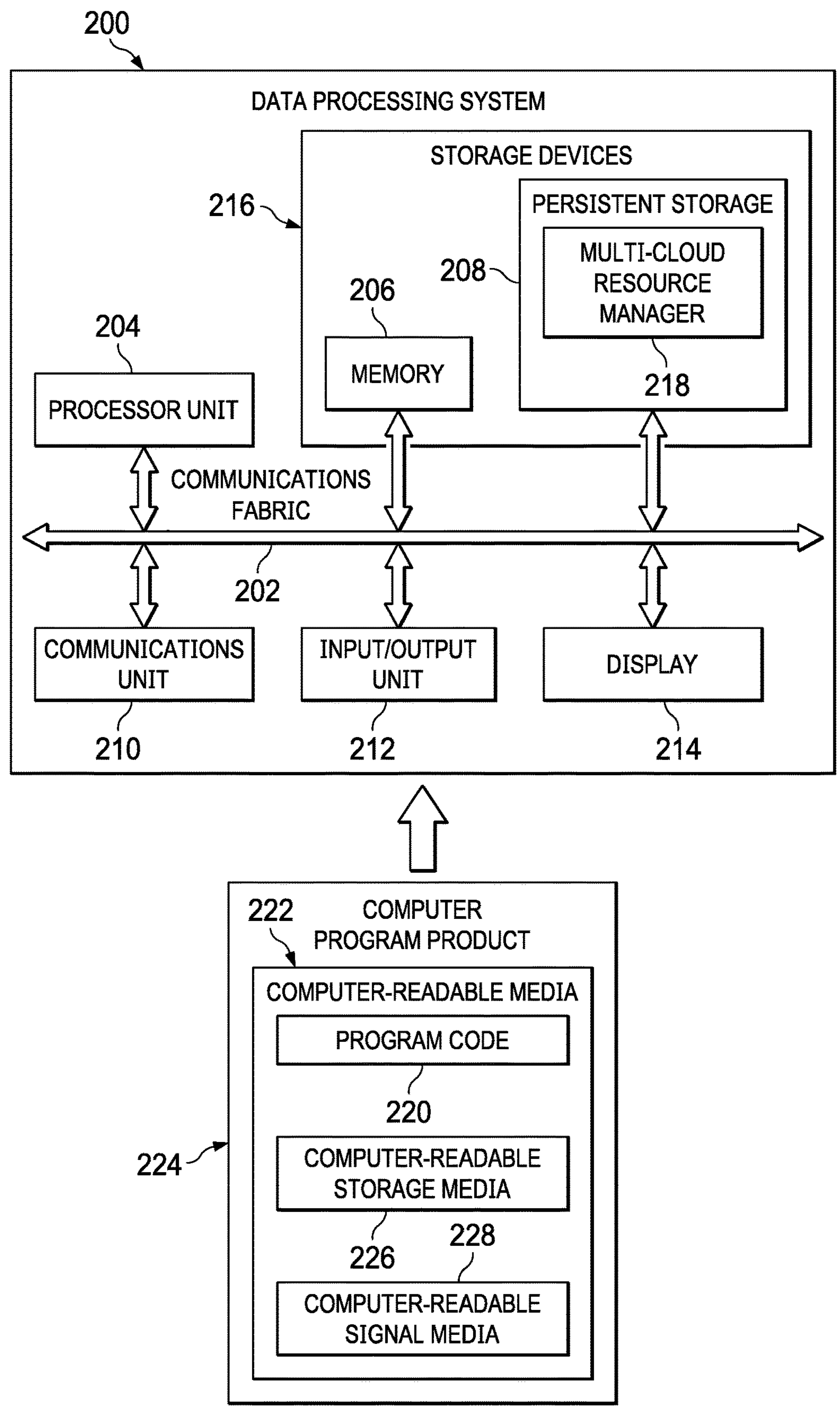
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer-readable program code or instructions implementing multi-cloud resource management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores multi-cloud resource manager 218. However, it should be noted that even though multi-cloud resource manager 218 is illustrated as residing in persistent storage 208, in an alternative illustrative embodiment, multi-cloud resource manager 218 may be a separate component of data processing system 200. For example, multi-cloud resource manager 218 may be a hardware component coupled to communication fabric 202 or a combination of hardware and software components. In another alternative illustrative embodiment, a first set of components of multi-cloud resource manager 218 may be located in data processing system 200 and a second set of components of multi-cloud resource manager 218 may be located in a second data processing system, such as, for example, server 106 in FIG. 1.

Multi-cloud resource manager 218 controls the process of detecting resource redundancy errors, resource conflict errors, and the like in a multi-cloud infrastructure comprised of a plurality of clouds corresponding to different cloud providers using a consolidated resource dependency graph of the multi-cloud infrastructure and rule sets provided by users, such as DevOps administrators, and the cloud providers to detect the errors. Further, multi-cloud resource manager 218 can automatically perform a set of action steps in response to detecting the resource errors in the multi-cloud infrastructure prior to resource deployment. As a result, data processing system 200 operates as a special purpose computer system in which multi-cloud resource manager 218 in data processing system 200 enables multi-cloud resource management. In particular, multi-cloud resource manager 218 transforms data processing system 200 into a special purpose computer system as compared to currently available general computer systems that do not have multi-cloud resource manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
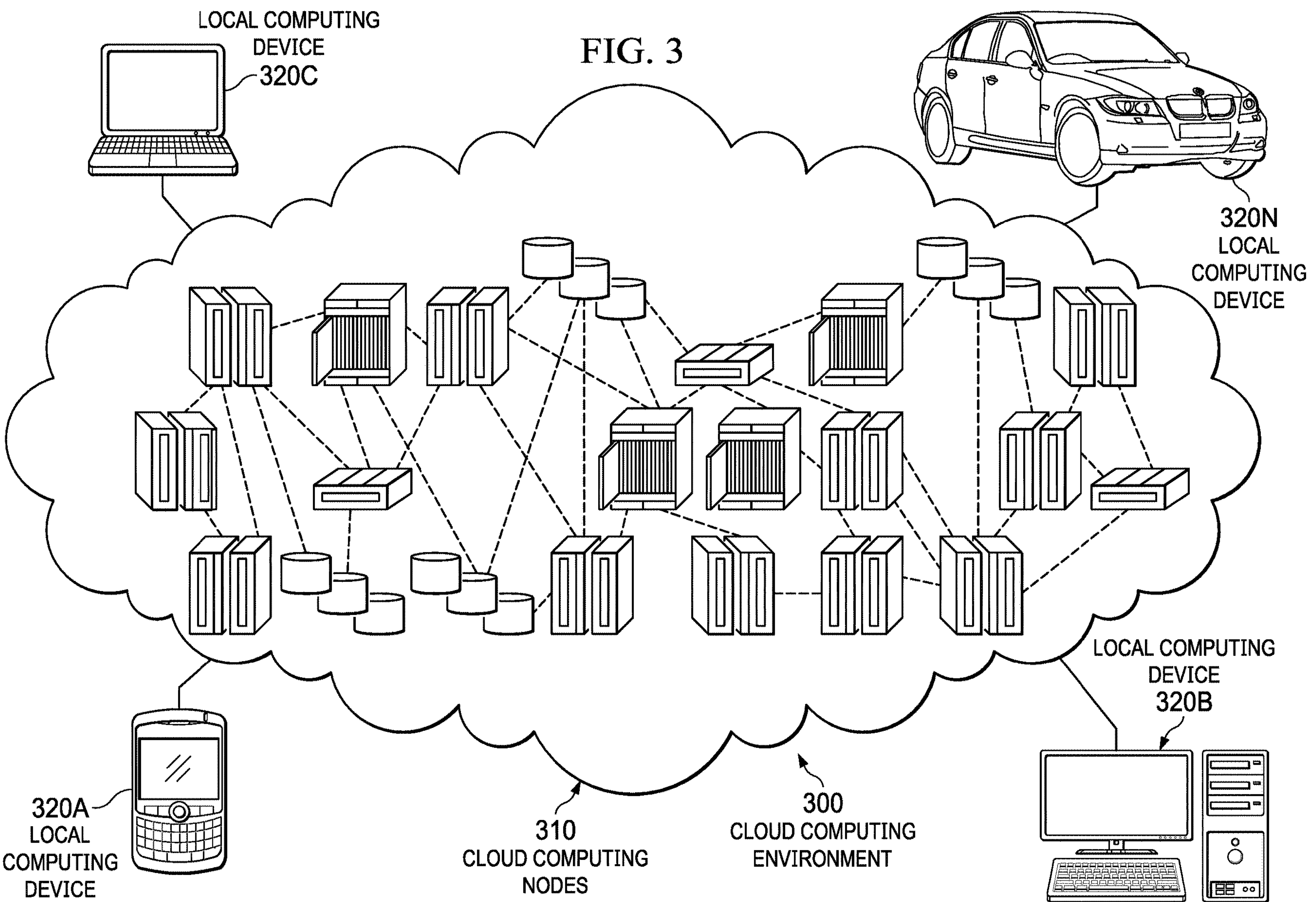
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
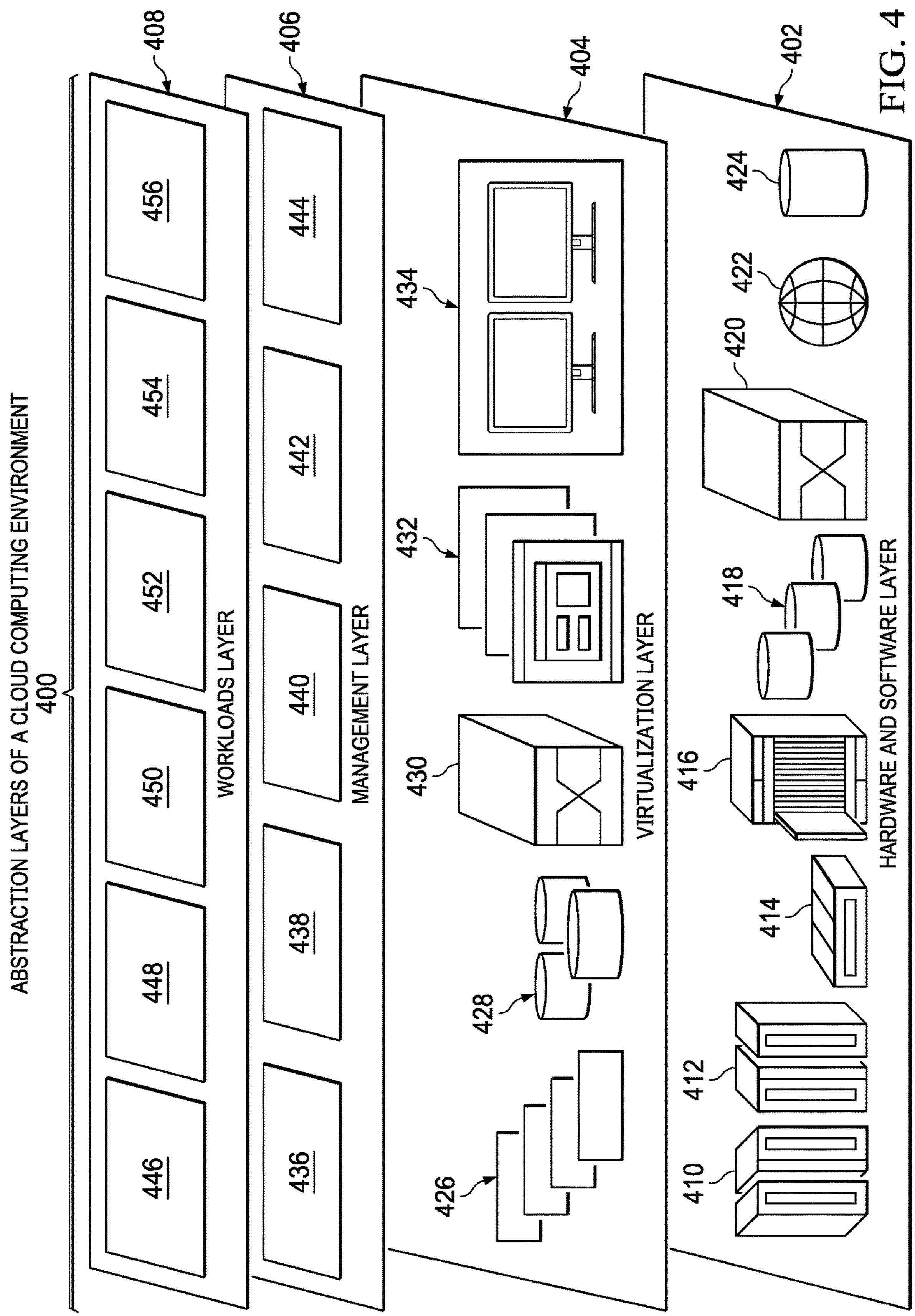
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and multi-cloud resource management 456.

Resource management is a core function of any computing system. Resource management affects performance, functionality, and cost of a computing system. Inefficient resource management has a direct negative effect on the performance and cost of the computing system and an indirect negative effect on the functionality of the computing system. As a result, inefficient resource management may cause some functions of the computing system to become too expensive to utilize or may be unused due to poor performance.

A cloud is a complex computing environment comprised of a large number of shared resources, which are subject to unpredictable client requests and affected by external events the cloud cannot control. In such complex computing environments, an infrastructure administrator needs to foresee potential issues early (e.g., prior to deploying the resources in the cloud), so that the infrastructure administrator can avoid introducing errors into the cloud.

DevOps administrators provision shared resources in a cloud using software, such as, for example, Infrastructure as Code (IaC), shell scripts, or other automation code. IaC is the management of infrastructure (e.g., networks, virtual machines, load balancers, connection topology, and the like) in a descriptive model, using the same versioning as the DevOps administrators utilize for source code. Similar to the principle that the same source code generates the same binary, an IaC model generates the same computing environment every time it is applied. The software helps a DevOps administrator to manage and provision computer data centers using machine-readable configuration files. Based on the complexity of the infrastructure and requirements, a software configuration file continues to increase in size as a DevOps administrator continues to create new resources in the infrastructure. As a multi-cloud infrastructure, which includes complex entities (e.g., banking entities, financial entities, securities entities, and the like), multiple cloud accounts, multiple shared resources, and multiple networks, increases in complexity, an infrastructure administrator needs to know and understand the infrastructure resource map of the multi-cloud environment in detail.

In addition, it is possible that a DevOps administrator can inadvertently provision several redundant and/or conflicting resources between different clouds in the multi-cloud infrastructure. Assume, for example, a DevOps administrator provisions multiple connectivity options in the multi-cloud infrastructure and is unaware of redundant or conflicting connectivity resources in the multi-cloud infrastructure. These connectivity resources are costly and add further load in the multi-cloud infrastructure. Thus, a need exists to notify the infrastructure administrator regarding the redundant or conflicting connectivity resources existing in the multi-cloud environment.

Currently, a DevOps administrator has to manually discover any redundant or conflicting resources in the multi-cloud infrastructure. Sometimes, redundant resources are unnecessary, which incur unnecessary cost and load in the multi-cloud infrastructure. Also, scenarios exist where a resource can cause a conflict with one or more other resources in the multi-cloud infrastructure. In such scenarios, only one resource dominates, and the other resources are suppressed or never used.

Currently, no solution exists by which a DevOps administrator can foresee errors in the multi-cloud infrastructure prior to provisioning the resources in the multi-cloud environment. Also, no solution currently exists where a DevOps administrator can view the complete multi-cloud infrastructure resource map all at one time. Several possible reasons exist for using a multi-cloud architecture, which may include, for example, reduced reliance on any one cloud provider, cost efficiency, increased flexibility, adherence to regulations requiring certain data to be physically present within a defined geographic area, distribution of processing requests to a geographically closer cloud to reduce network latency, militating disasters, and the like.

Illustrative embodiments identify redundant resource errors, conflicting resource errors, and any other resource errors in a multi-cloud infrastructure using a single consolidated resource dependency graph. Illustrative embodiments utilize a multi-cloud resource deployment error analyzer that lists all redundant resources, conflicting resources, and any other resource errors, along with the cost incurred by each of these resources, in a resource error table. Based on information in the resource error table, the infrastructure administrator can determine whether to keep, correct, or eliminate one or more of these resources. Also, a DevOps administrator can check the redundant and conflicting resources listed in the resource error table before provisioning any new resources, such as, for example, gateways, connections, security group rules, and the like, in the multi-cloud infrastructure. In addition, illustrative embodiments identify the redundant and conflicting resource errors in the current software configuration file and inform the infrastructure administrator of the errors prior to execution of the software configuration file to deploy the new resource. After notification of the identified redundant and conflicting resource errors in the software configuration file, the infrastructure administrator can modify the code in the software configuration file to, for example, reuse existing resources and eliminate conflicting resources. Thus, illustrative embodiments reduce the unnecessary workload and cost in the multi-cloud infrastructure and increase multi-cloud infrastructure performance by identifying the redundant and conflicting resources prior to execution of the software configuration file.

Illustrative embodiments generate and continually update the single consolidated resource dependency graph for the multi-cloud environment. Illustrative embodiments merge or combine all the software configuration files corresponding to each of the different clouds comprising the multi-cloud environment to form the single consolidated resource dependency graph for the multi-cloud infrastructure. Illustrative embodiments crawl and analyze all the nodes of the single consolidated dependency graph of the multi-cloud infrastructure representing all the resources of the multi-cloud infrastructure to identify redundant and conflicting resources, such as, for example, gateways, connections, security group rules, and the like. Further, illustrative embodiments calculate the cost of these redundant and conflicting resources and inform the infrastructure administrator when redundant and/or conflicting resources exist in cloud accounts corresponding to the multi-cloud infrastructure.

Illustrative embodiments identify redundant and conflicting resources at the individual cloud level of the multi-cloud infrastructure. Illustrative embodiments check each individual cloud to determine whether a respective resource is redundant or could cause a conflict in that particular cloud. Illustrative embodiments identify the redundant and conflicting resources based on the parent/child node relationships in the resource dependency graph corresponding to that particular cloud. For example, illustrative embodiments search the resource dependency graph of a cloud for a child resource node, such as, for example, a security group rule, that is attached to a same parent resource node as another child resource node via an edge and is the same or equal (i.e., redundant). When child resource nodes, which are sibling resource nodes at a same level under the same parent resource node within the resource dependency graph, represent a same or similar type of resource, illustrative embodiments inform the infrastructure administrator of the redundancy to remove the redundant resource when appropriate. Alternatively, illustrative embodiments can automatically remove the redundant resource from the cloud and notify the infrastructure administrator of the removal. Further, illustrative embodiments search the resource dependency graph of the cloud to determine whether a conflict exists between resources corresponding to sibling resource nodes under a same parent resource node. If a conflict exists between resources, then illustrative embodiments inform the infrastructure administrator of the conflict to remove the conflict. Alternatively, illustrative embodiments can automatically remove the conflicting resource from the cloud and notify the infrastructure administrator of the removal.

Furthermore, illustrative embodiments combine, merge, or aggregate all the individual resource dependency graphs corresponding to the plurality of clouds comprising the multi-cloud infrastructure into a single consolidated resource dependency graph of the multi-cloud infrastructure. Then, illustrative embodiments identify redundant and conflicting resources at the multi-cloud level of the multi-cloud infrastructure. For example, illustrative embodiments search the consolidated multi-cloud resource dependency graph looking for sibling resource nodes, which correspond to resources, such as, for example, gateways, connections, security group rules, and the like, that are attached to the same parent resource node via edges and are redundant or causing a conflict.

Illustrative embodiments generate a dependency graph of all operations involved in each respective software configuration file of the various clouds in the multi-cloud infrastructure. In other words, illustrative embodiments continue to record all the software configuration files that have been executed in the multi-cloud infrastructure. The single consolidated resource dependency graph of the multi-cloud infrastructure provides an overall view of the entire multi-cloud infrastructure. Illustrative embodiments provide the overall view of the entire multi-cloud infrastructure to the infrastructure administrator in a single display panel or dashboard.

Moreover, illustrative embodiments identify all child resource nodes that are dependent on a same parent resource node in the consolidated multi-cloud resource dependency graph and determine whether resources corresponding to dependent child resource nodes are redundant (e.g., same, equal, duplicative, identical, or the like) or are causing a conflict. As an illustrative example, illustrative embodiments check nodes corresponding to network resources, such as, for example, gateways and connections, in a cloud account corresponding to the multi-cloud infrastructure. In this illustrative example, the connections are represented by child resource nodes that are siblings and dependent on the same parent resource node, which represents the gateway. Illustrative embodiments compare whether the connections are equal (i.e., redundant). Illustrative embodiments record the gateway and its redundant or duplicate connections in the resource error table. When illustrative embodiments determine that the connections are not equal, then illustrative embodiments check whether the connections can cause a conflict by comparing attributes, such as, for example, network address prefixes, subnet identifiers, and the like, corresponding to the connections. A conflict exists when the attributes of one connection are the same or match the attributes of another connection. Illustrative embodiments record the gateway and the gateway's conflicting connections in the resource error table.

When illustrative embodiments find that cross-account connections exist in a same cloud, illustrative embodiments record the gateway and the gateway's redundant and conflicting connections across cloud accounts in that cloud. For example, a public cloud may have a customer that has multiple virtual private clouds on that public cloud, each virtual private cloud being a different cloud account for that customer via a transit gateway. As a result, the multiple cloud accounts of that customer can create cross-account connections via the transit gateway. Similarly, illustrative embodiments record redundant and conflicting connections across multi-cloud accounts as well. When illustrative embodiments determine that connections are redundant or conflicting, illustrative embodiments report the redundancy or conflict to the infrastructure administrator, along with incurred cost and other connection details, such as, for example, when a connection was last used, how frequently the connection was used in a day, week, month, or year, and the like. Illustrative embodiments can utilize cloud monitoring tools to collect such metrics.

Illustrative embodiments report the redundant and conflicting resources in the current software configuration file of a cloud to the infrastructure administrator prior to execution of that file. The infrastructure administrator can review the redundant and conflicting resources in the cloud and determine, for example, whether existing resources can be reused in the current software configuration file instead of creating new resources, thereby, reducing cost. In addition, the infrastructure administrator can review the single consolidated resource dependency graph of the multi-cloud infrastructure to learn how resources are dependent across various cloud accounts and clouds. For example, before the infrastructure administrator decides to remove a particular resource, cloud account, or cloud, the infrastructure administrator can look at this single consolidated multi-cloud resource dependency graph to understand the impact of removing that particular resource, cloud account, or cloud. Further, the infrastructure administrator can decide whether to create a virtual private cloud peering or transit gateway connection before the infrastructure administrator creates virtual private cloud connectivity options. By looking at the consolidated multi-cloud resource dependency graph, the infrastructure administrator can determine how to reduce or save cost by eliminating certain network resources in the multi-cloud infrastructure.

A virtual private cloud is a public cloud offering that allows an entity to establish the entity's own private cloud-like computing environment on a shared public cloud infrastructure. A virtual private cloud provides the entity with an ability to define and control a virtual network that is logically isolated from all other public cloud tenants, which creates a private, secure place on the public cloud for the entity. In other words, a virtual private cloud is an on-demand configurable pool of shared resources allocated within a public cloud environment, providing a certain level of isolation between the different entities using the shared resources. A virtual private cloud's logical isolation is implemented using virtual network functions and security features that provide the entity with granular control over which internet protocol addresses or applications can access particular resources. The isolation between one virtual private cloud entity and all other entities of the same virtual private cloud is achieved normally through allocation of a private internet protocol subnet and a virtual communication construct (such as a virtual local area network or a set of encrypted communication channels) per entity.

Thus, illustrative embodiments provide one or more technical solutions that overcome a technical problem with detecting resource redundancy and conflicts in a multi-cloud infrastructure comprised of a plurality of clouds corresponding to different cloud providers. As a result, these one or more technical solutions provide a technical effect and practical application in the field of multi-cloud resource management.

Figure 5:
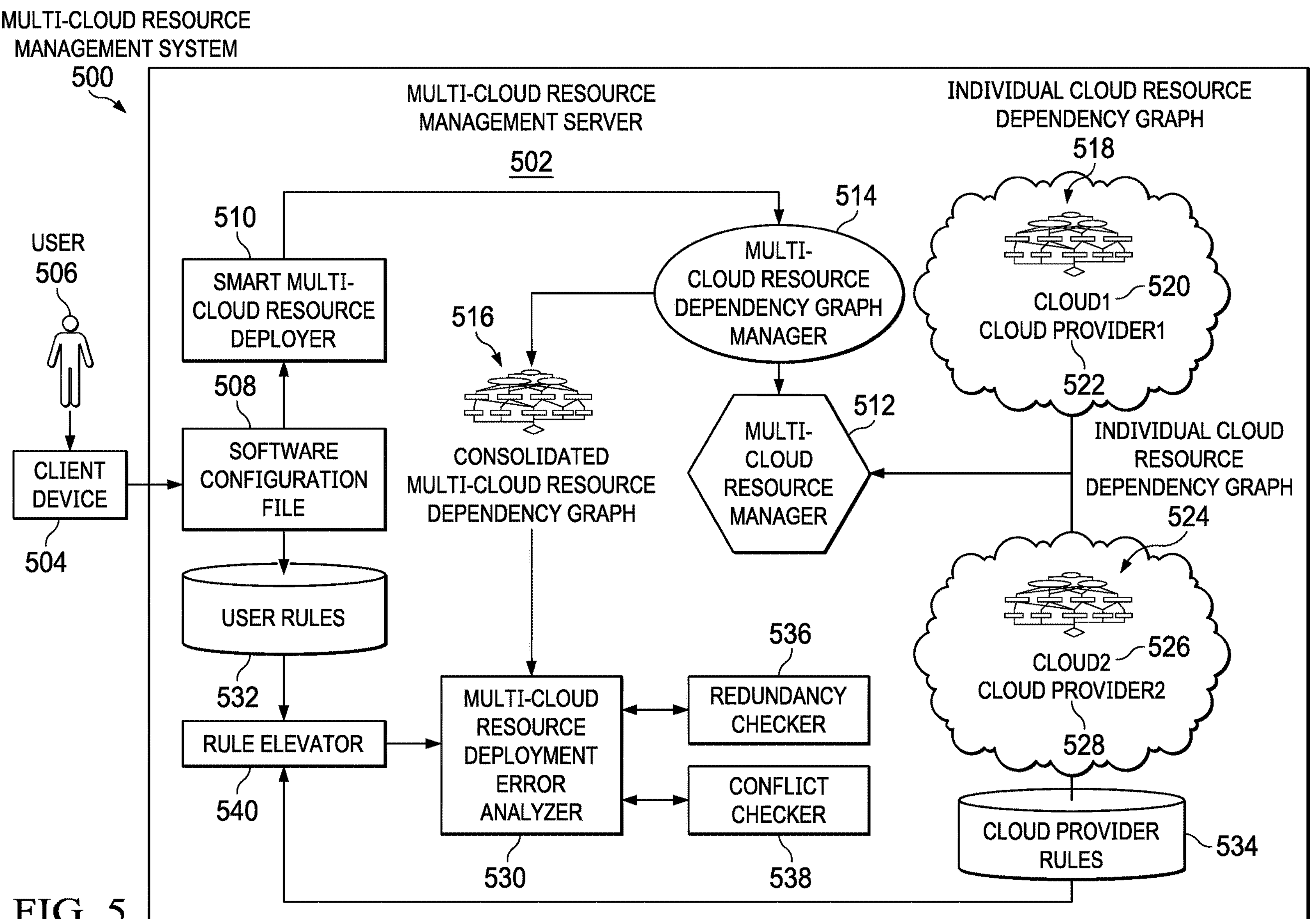
FIG. 5 is a diagram illustrating an example of a multi-cloud management system in accordance with an illustrative embodiment.

With reference now to FIG. 5, a diagram illustrating an example of a multi-cloud management system is depicted in accordance with an illustrative embodiment. Multi-cloud management system 500 may be implemented in a network of data processing systems, such as network data processing system 100 in FIG. 1, or a cloud computing environment, such as cloud computing environment 300 in FIG. 3. Multi-cloud management system 500 is a system of hardware and software components for detecting resource redundancy errors, resource conflict errors, and the like in a multi-cloud infrastructure comprised of a plurality of clouds corresponding to different cloud providers using a consolidated resource dependency graph of the multi-cloud infrastructure and rule sets provided by users and the cloud providers to detect the errors.

In this example, multi-cloud management system 500 includes multi-cloud resource management server 502 and client device 504. However, it should be noted that multi-cloud management system 500 is intended as an example only and not as a limitation on illustrative embodiments. In other words, multi-cloud management system 500 may include any number of servers, client devices, and other components.

User 506, such as, for example, a DevOPs administrator, using client device 504, submits software configuration file 508 to multi-cloud resource management server 502 via smart multi-cloud resource deployer 510. Client device 504 may be, for example, client 110 in FIG. 1 or local computing device 320B in FIG. 3. Multi-cloud resource management server 502 may be, for example, server 104 in FIG. 1, data processing system 200 in FIG. 2, or a cloud computing node of cloud computing nodes 310 in FIG. 3. Software configuration file 508 may be, for example, an IaC, shell script, or any other automation code file. It should be noted that in alternative illustrative embodiments, smart multi-cloud resource deployer 510 may be a component of multi-cloud resource manager 512. Smart multi-cloud resource deployer 510 is the entry point to deploy all software configuration files. Furthermore, smart multi-cloud resource deployer 510 is cloud provider agnostic. For example, user 506 submits software configuration file 508 for any specific type of cloud corresponding to a particular cloud provider. When user 506 submits software configuration file 508, smart multi-cloud resource deployer 510 recognizes the cloud provider from the software configuration file. In addition, smart multi-cloud resource deployer 510 maintains all multi-cloud accounts.

Upon receiving software configuration file 508, smart multi-cloud resource deployer 510 utilizes multi-cloud resource dependency graph manager 514 to generate consolidated multi-cloud resource dependency graph 516. Multi-cloud resource dependency graph manager 514 generates consolidated multi-cloud resource dependency graph 516 by merging a resource dependency graph corresponding to software configuration file 508 for the specific type of cloud of that particular cloud provider with individual cloud resource dependency graph 518 corresponding to cloud1 520 of cloud provider1 522 and individual cloud resource dependency graph 524 corresponding to cloud2 526 of cloud provider2 528 received from multi-cloud resource manager 512. Multi-cloud resource dependency graph manager 514 inputs consolidated multi-cloud resource dependency graph 516 into multi-cloud resource deployment error analyzer 530 for resource error analysis.

Multi-cloud resource deployment error analyzer 530 checks consolidated multi-cloud resource dependency graph 516 for resource errors, such as, for example, resource redundancy errors and resource conflict errors, utilizing user rules 532 provided by user 506 and cloud provider rules 534 provided by cloud provider1 522 and cloud provider2 528. Multi-cloud resource deployment error analyzer 530 utilizes redundancy checker 536 to check for undesired multi-cloud resource redundancies and conflict checker 538 to check for multi-cloud resource conflicts. It should be noted that rule evaluator 540 evaluates user rules 532 and cloud provider rules 534 for inconsistencies prior to multi-cloud resource deployment error analyzer 530 utilizing the rules to analyze consolidated multi-cloud resource dependency graph 516 for resource errors via redundancy checker 536 and conflict checker 538.

User rules 532 may be any type of rules, such as, for example, whether security certificates are in a beta or general availability version or any kind of security and compliance rules. For example, user rules 532 may include a rule for whether a particular set of resources are going to be provisioned in a defined geographic region based on regulations. It should be noted that user 506 can add any custom rule extension or plugin for additional error checks by multi-cloud resource deployment error analyzer 530. Cloud provider rules 534, which are specific to cloud provider1 522 and cloud provider2 528, may be for detecting redundancy and conflicts in resources. If multi-cloud resource deployment error analyzer 530 detects any rule violation of either user rules 532 or cloud provider rules 534, multi-cloud resource deployment error analyzer 530 records that error in a resource error table.

Multi-cloud resource deployment error analyzer 530 crawls and analyzes each respective resource node in consolidated multi-cloud resource dependency graph 516 and generates the resource error table. While crawling through the resource nodes of consolidated multi-cloud resource dependency graph 516, multi-cloud resource deployment error analyzer 530 identifies all child resource nodes that are sibling nodes at a same level and dependent on a parent resource node and then determines whether two or more child resource nodes are equal (i.e., redundant) or could cause a conflict. For example, multi-cloud resource deployment error analyzer 530 checks network resource nodes corresponding to transit gateways and connections in a cloud account. Connections are represented as child resource nodes at a same level in consolidated multi-cloud resource dependency graph 516 that are dependent on a same parent resource node representing the transit gateway. Multi-cloud resource deployment error analyzer 530 determines whether the connections are redundant. When multi-cloud resource deployment error analyzer 530 determines that the connections are redundant, multi-cloud resource deployment error analyzer 530 automatically removes the unused and undesired redundant resource and notifies user 506 of the removal. When multi-cloud resource deployment error analyzer 530 determines that the connections are not redundant, multi-cloud resource deployment error analyzer 530 checks whether the connections could cause a conflict by comparing the attributes of the connections. When multi-cloud resource deployment error analyzer 530 determines that the connections are conflicting, multi-cloud resource deployment error analyzer 530 records the transit gateway and its conflicting connections in the resource error table and automatically removes the conflicting resource based on at least one of user rules 532 or cloud provider rules 534.

When multi-cloud resource deployment error analyzer 530 identifies that redundant cross-account connections in a same cloud exist, multi-cloud resource deployment error analyzer 530 records the transit gateway and its redundant connections across cloud accounts in the resource error table. Similarly, multi-cloud resource deployment error analyzer 530 records redundant connections across multi-cloud accounts as well. When connections are redundant or could cause a conflict, multi-cloud resource deployment error analyzer 530 reports the error to user 506 (e.g., an infrastructure administrator), along with incurred cost and other connection details, such as, for example, when a connection was last used, how frequently the connection was used in a day, week, month, year, or the like. Multi-cloud resource deployment error analyzer 530 can collect such metrics using cloud monitoring tools.

Figure 6:
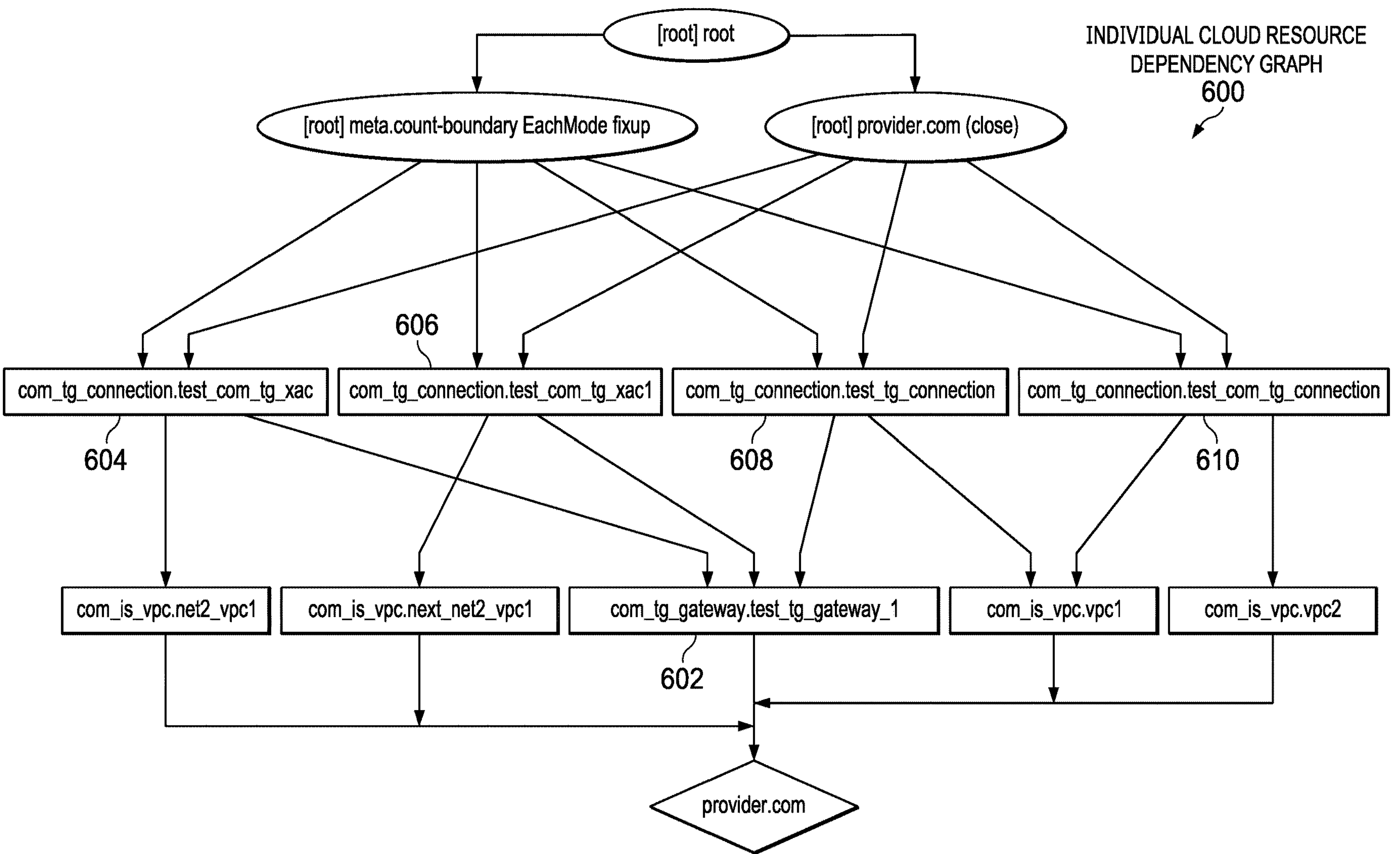
FIG. 6 is a diagram illustrating an example of an individual cloud resource dependency graph in accordance with an illustrative embodiment.

With reference now to FIG. 6, a diagram illustrating an example of an individual cloud resource dependency graph is depicted in accordance with an illustrative embodiment. Individual cloud resource dependency graph 600 may be implemented in a multi-cloud resource manager, such as, for example, multi-cloud resource manager 512 in FIG. 5. In addition, individual cloud resource dependency graph 600 may be, for example, individual cloud resource dependency graph 518 in FIG. 5. Individual cloud resource dependency graph 600 is a resource dependency graph for a software configuration file corresponding to a single cloud provider account, such as, for example, cloud provider1 522 in FIG. 5. A multi-cloud resource deployment error analyzer, such as, for example, multi-cloud resource deployment error analyzer 530 in FIG. 5, identifies redundant and conflicting resources in individual cloud resource dependency graph 600 for the single cloud provider account.

Software configuration file tools, such as, for example, IaC tools, already provide support for generating a resource dependency graph from a software configuration file, such as, for example, software configuration file 508 in FIG. 5. If a software configuration file tool does not support resource dependency graph generation, then the resource dependency graph can be generated by searching through the software configuration file and storing the data in a table, along with the software configuration file's dependencies and resource metadata.

In this example, individual cloud resource dependency graph 600 indicates that gateway test_tg_gateway_1 602 (i.e., parent resource node) has 4 connections (dependent child resource nodes that are sibling nodes at a same level). The 4 connections to gateway test_tg_gateway_1 602 are: 1) com_tg_connection.test_com_tg_xac 604 (connected to vpc: net2-vpc-1); 2) com_tg_connection.test_com_tg_xac1 606 (connected to vpc: net2-vpc-1); 3) com_tg_connection.test_tg_connection 608 (connected to vpc: test-vpc-1); and 4) com_tg_connection.test_com_tg_connection 610 (connected to vpc: test-vpc-2). In this example, com_tg_connection.test_com_tg_xac 604 and com_tg_connection.test_com_tg_xac1 606 are redundant resources because com_tg_connection.test_com_tg_xac 604 and com_tg_connection.test_com_tg_xac1 606 are connecting to the same virtual private cloud (i.e., vpc: net2-vpc-1) in another cloud provider account. Details of the virtual private cloud (vpc) can be found from the cloud resource name of the cloud resource vpc.

Illustrative embodiments utilize two approaches for finding redundancy and conflicts in cloud resources. The two approaches are a cloud provider specific code approach and a declarative approach. The cloud provider specific code approach implements the cloud resource redundancy and conflicts checks in provider specific code. In the declarative approach, the cloud provider specifies a set of attributes, which can result in redundancy or conflicts, for each respective resource type in that particular cloud of the cloud provider.

For example, in the cloud provider specific code approach, the cloud provider writes the code or logic in the software configuration file to compare two cloud resources when the two cloud resources are equal or the same (i.e., redundant). As an illustrative code example in the software configuration file, security group rules are the same when protocol (e.g., internet control message protocol (icmp), code, and type), direction, and address are all the same such as:

```
resource "com_is_security_group_rule" "cr_sg_rule_out_icmp" {
 depends_on = [data.com_is_vpc.test_cr_vpc]
 group = com_is_security_group.cr_security_group.id
 direction = "outbound"
 remote = "0.0.0.0/0"
 icmp {
   code = 0
   type = 8
 }
}.
```

The cloud provider can write the code in the software configuration file using an equals( ) method. Using the code, a multi-cloud resource deployment error analyzer, such as, for example, multi-cloud resource deployment error analyzer 530 in FIG. 5, can easily compare 2 resources in the cloud. The multi-cloud resource deployment error analyzer uses the equals( ) method to perform the resource redundancy check. Similarly, the cloud provider writes the code to detect whether two cloud resources can cause a conflict in the cloud. Whenever a conflict exists between cloud resources, only one resource dominates, and the other resources are suppressed. The method to detect cloud resource conflict is similar to the equals( ) method for detecting resource redundancy in the cloud. To detect cloud resource conflict, the cloud provider can utilize a conflict( ) method in the code that compares cloud resource attributes. The conflict( ) method indicates that 2 cloud resources have a conflict when, for example, the subnet is the same, priority/weightage is the same, direction/action is opposite, or the like.

In the declarative approach the cloud provider can specify or define the resource attributes in the software configuration file that can result in either redundancy or conflicts for each respective resource type in the cloud corresponding to the cloud provider. The cloud provider may utilize, for example, YAML Ain't Markup Language (YAML), which is a human-readable data-serialization language, to specify the attributes for each respective resource type. YAML is commonly used for software configuration files.

Illustrative examples of specifying resource attributes that can result in redundancy using YAML in the software configuration file are:

```
redundancy.yaml:
security_group_rule (resource type):
    - direction (attribute)
    - protocol (attribute)
transit_gateway_connection (resource type):
    - vpc_id (attribute).
```

Illustrative examples of specifying resource attributes that can result in conflict using YAML in the software configuration file are:

```
conflicts.yaml:
security_group_rule (resource type):
    - action (attribute)
    - priority (attribute)
transit_gateway_connection (resource type):
   - address_prefix (attribute)
   - subnet_id (attribute).
```

The multi-cloud resource deployment error analyzer looks at the redundancy.yaml and the conflicts.yaml in the software configuration file and compares the attributes specified under each respective resource type. When the attributes are the same for sibling resource nodes at a same level under a parent resource node in the resource dependency graph of the cloud, then the multi-cloud resource deployment error analyzer concludes that the cloud resources corresponding to the sibling nodes having the same attributes are redundant and informs the infrastructure administrator of the redundancy. Similarly, the multi-cloud resource deployment error analyzer compares the attribute specified under each respective resource type to determine whether the attributes are different for a set of cloud resources of the same resource type corresponding to dependent sibling resource nodes under a same parent resource node. When the attributes are different, but conflicting, the multi-cloud resource deployment error analyzer informs the infrastructure administrator of the conflict. In addition, the multi-cloud resource deployment error analyzer may inform the multi-cloud resource manager of the redundancy and conflict error for appropriate action. For example, the multi-cloud resource manager may automatically remove redundant and conflicting cloud resources from one or more clouds in the multi-cloud infrastructure.

Thus, illustrative embodiments reduce cloud cost by removing redundant and conflicting resources. As an illustrative example, assume there are 2 virtual private clouds (vpc-1 and vpc-2), and the 2 virtual private clouds are connected to a same transit gateway. However, the 2 virtual private clouds have a conflict in subnet (e.g., the subnet range is the same). For example, the 2 virtual private clouds are connected with the transit gateway so that a virtual server instance (vsi-1) in one of the virtual private clouds (vpc-1) can connect to another virtual server instance (vsi-3) using a private internet protocol address. Because the subnet ranges for the 2 virtual private clouds are same, when virtual server instance (vsi-1) in virtual private cloud (vpc-1) tries to connect to virtual server instance (vsi-3), the internet protocol address gets resolved to a different virtual server instance (vsi-2) in virtual private cloud (vpc-1) and never reaches virtual private cloud (vpc-2). Hence, the transit gateway is of no use as virtual private cloud (vpc-1) and virtual private cloud (vpc-2) can never communicate with each other. As a result, the transit gateway will not be used. The transit gateway is now a costly cloud resource not being used because of the conflict. If illustrative embodiments inform the infrastructure administrator regarding the transit gateway prior to resource deployment, then the infrastructure administrator can, for example, correct the virtual private cloud subnet range or remove the transit gateway resource. Consequently, by removing the conflict, cost of operating the cloud is reduced.

To detect the conflict in the illustrative example above, illustrative embodiments can use the conflict( ) method for transit gateway connections to compare the subnet ranges of dependent sibling nodes representing transit gateway connections at the same level in the resource dependency graph under the same parent resource node representing the transit gateway (TG). An illustrative example of the conflict( ) method for this use case may be:

```
Conflict( ) {
a. call equals( ) method, find if the TG connections are same. If same,
inform user that the connections are redundant.
b. If connections are different, then compare the subnet range of VPCs.
c. If there is a conflict in subnet range, inform the user regarding
conflicting resources.
}.
```

It should be noted that all subnets of the virtual private clouds and classic network will connect to the transit gateway. As a result, the subnets should not overlap. Therefore, when creating virtual private clouds that are intended to connect to a transit gateway, the virtual private clouds should be created with non-overlapping network prefixes and unique subnets.

With reference now to FIG. 7, a diagram illustrating an example of an outbound security rules table is depicted in accordance with an illustrative embodiment. Outbound security group rules table 700 may be implemented in a multi-cloud resource manager, such as, for example, multi-cloud resource manager 512 in FIG. 5.

In this example, outbound security group rules table 700 include 3 outbound security group rules: outbound security group rule 702, outbound security group rule 704, and outbound security group rule 706. Outbound security group rule 702 and outbound security group rule 706 have the same priority (i.e., 65000). However, outbound security group rule 702 is allowing all outbound access and outbound security group rule 706 is denying all outbound access. As a result, a conflict exits between cloud resources outbound security group rule 702 and outbound security group rule 706. Consequently, out of the 3 outbound security group rules, 2 are of no use due to the conflict. This conflict is incurring cost to the multi-cloud infrastructure. If illustrative embodiments inform the infrastructure administrator regarding this conflict in outbound security group rules prior to deployment, the infrastructure administrator can research the conflicting resource error and correct it.

To detect the conflict in the illustrative example above, illustrative embodiments can use the conflict( ) method for outbound security group rules to compare the priority and action of dependent sibling nodes representing outbound security group rules at the same level in the resource dependency graph under the same parent resource node representing the security group (SG).

An illustrative example of the conflict( ) method for this use case may be:

```
Conflict( ) {
a. call equals( ) method, find if the SG rules are same. If same, inform user
that the rules are redundant.
b. If rules are different, then compare the action and priority for conflict.
c. If there is a conflict, inform the user regarding conflicting resources.
}.
```

With reference now to FIG. 8, a diagram illustrating an example of a resource dependency table is depicted in accordance with an illustrative embodiment. Resource dependency table 800 may be implemented in a multi-cloud resource manager, such as, for example, multi-cloud resource manager 512 in FIG. 5.

Illustrative embodiments can parse a software configuration file, such as, for example, software configuration file 508 in FIG. 5, to generate, for example, a JavaScript Object Notation (JSON) file. The JSON file can contain various information regarding how various nodes are connected in the resource dependency graph corresponding to the parsed software configuration file, such as, for example, parent nodes, dependent nodes, source, destination, and the like, and the edges by which respective nodes are connected to one another in the graph. Using the JSON file, illustrative embodiments search for parent node/child node relationships. Illustrative embodiments search the array of edges of a parent/child node relationship and make an entry in resource dependency table 800 until the edge reaches the destination which contains close.

Resource dependency table 800 is for a particular cloud account, such as, for example, cloud account "XYZ", containing information regarding all the resources and their dependencies corresponding to the cloud account. Illustrative embodiments determine whether a connection is redundant or conflicting by analyzing the cloud resource name of each respective cloud resource. In this example, connections test_com_tg_xac 802 and test_comm_tg_xac1 804 are redundant connections because test_com_tg_xac 802 and test_comm_tg_xac1 804 connect to the same virtual private cloud.

With reference now to FIG. 9, a diagram illustrating an example of a desirable resource redundancy table is depicted in accordance with an illustrative embodiment. Desirable resource redundancy table 900 may be implemented in a multi-cloud resource manager, such as, for example, multi-cloud resource manager 512 in FIG. 5.

Desirable resource redundancy table 900 indicates whether redundancy of a respective resource type is desirable or undesirable in a multi-cloud infrastructure. For example, scenarios exist where redundancy of cloud resources are desired and needed. For example, a plurality of redundant gateways is configured in a network for high availability. Similarly, a plurality of redundant virtual server instances is configured in a subnet of a network for failover. In such cases, the infrastructure administrator defines the list of desired and un-desired redundant resources in the software configuration file of the cloud. Based on the list of desired and un-desired redundant resources, illustrative embodiments can inform the infrastructure administrator regarding the redundant resources in priority order. Illustrative embodiments can display desirable resource redundancy table 900 to the infrastructure administrator so that the infrastructure administrator can review undesired redundant resources with high priority, such as com_is_security_group_rule 902, followed by desired redundant resources with high priority, such as com_tg_gateway 904. Based on the information in desirable resource redundancy table 900, the infrastructure administrator can remove specific resources if redundancy is not desired or needed for high availability.

In this example, the DevOps administrator does not need resource type com_is_security_group_rule 902 to be redundant. When illustrative embodiments determine that com_is_ security_group_rule 902 is redundant for a virtual server instance, illustrative embodiments inform the infrastructure administrator with highest priority (e.g., 1) followed by list of desired redundant resource types, such as, for example, gateways and connections. Illustrative embodiments list the desired and un-desired resource types in priority order in desirable resource redundancy table 900.

Figure 10:
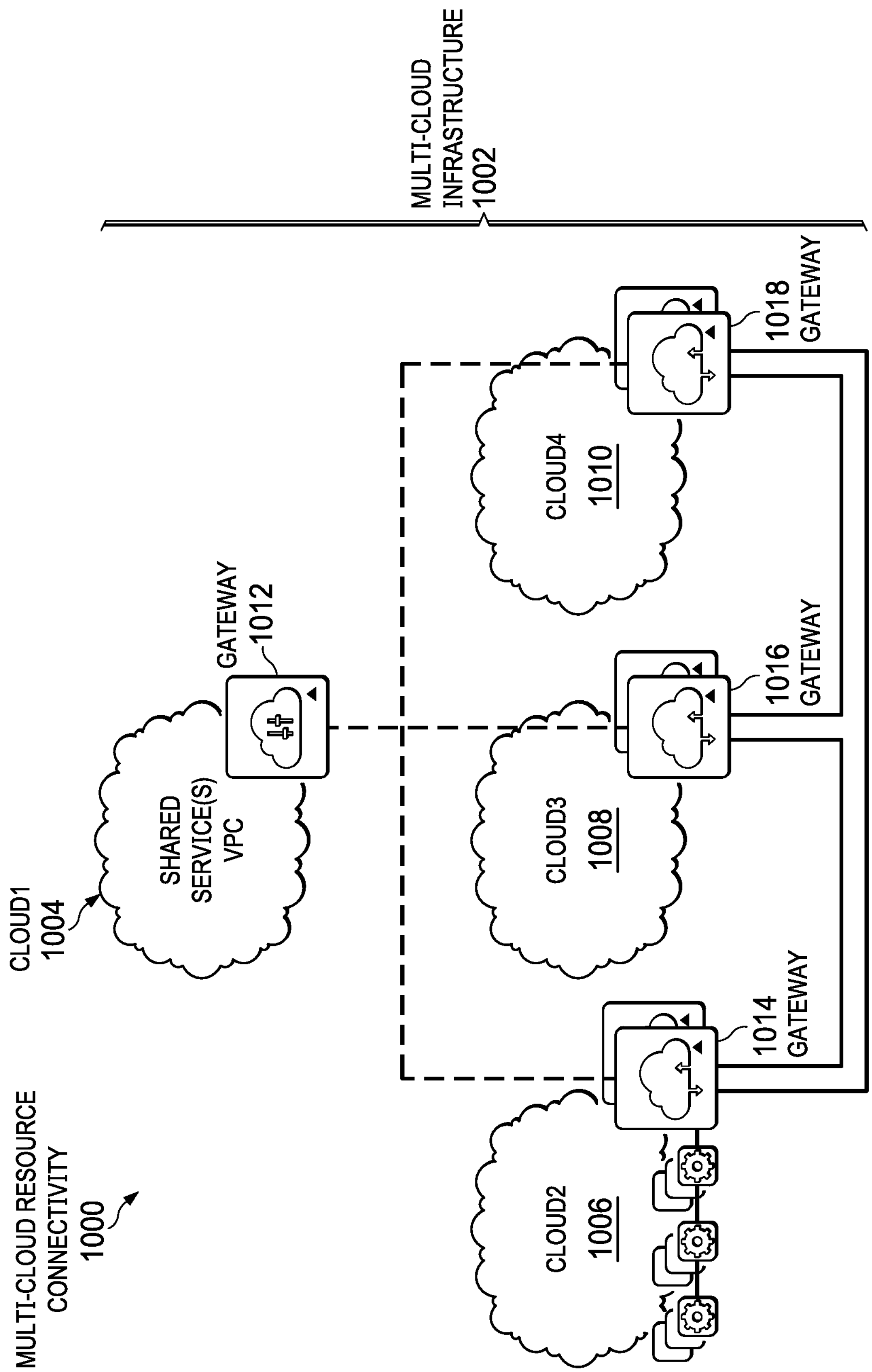
FIG. 10 is a diagram illustrating an example of multi-cloud resource connectivity in accordance with an illustrative embodiment.

With reference now to FIG. 10, a diagram illustrating an example of multi-cloud resource connectivity is depicted in accordance with an illustrative embodiment. Multi-cloud resource connectivity 1000 illustrates resource connectivity between clouds in multi-cloud infrastructure 1002. In this example, multi-cloud infrastructure 1002 includes cloud1 1004, cloud2 1006, cloud3 1008, and cloud4 1010. Gateways 1012, 1014, 1016, and 1018 are connected across the different clouds. If redundant gateways exist across 2 clouds, then illustrative embodiments can inform the infrastructure administrator in priority order based on information in a desirable resource redundancy table, such as, for example, desirable resource redundancy table 900 in FIG. 9.

Figure 11:
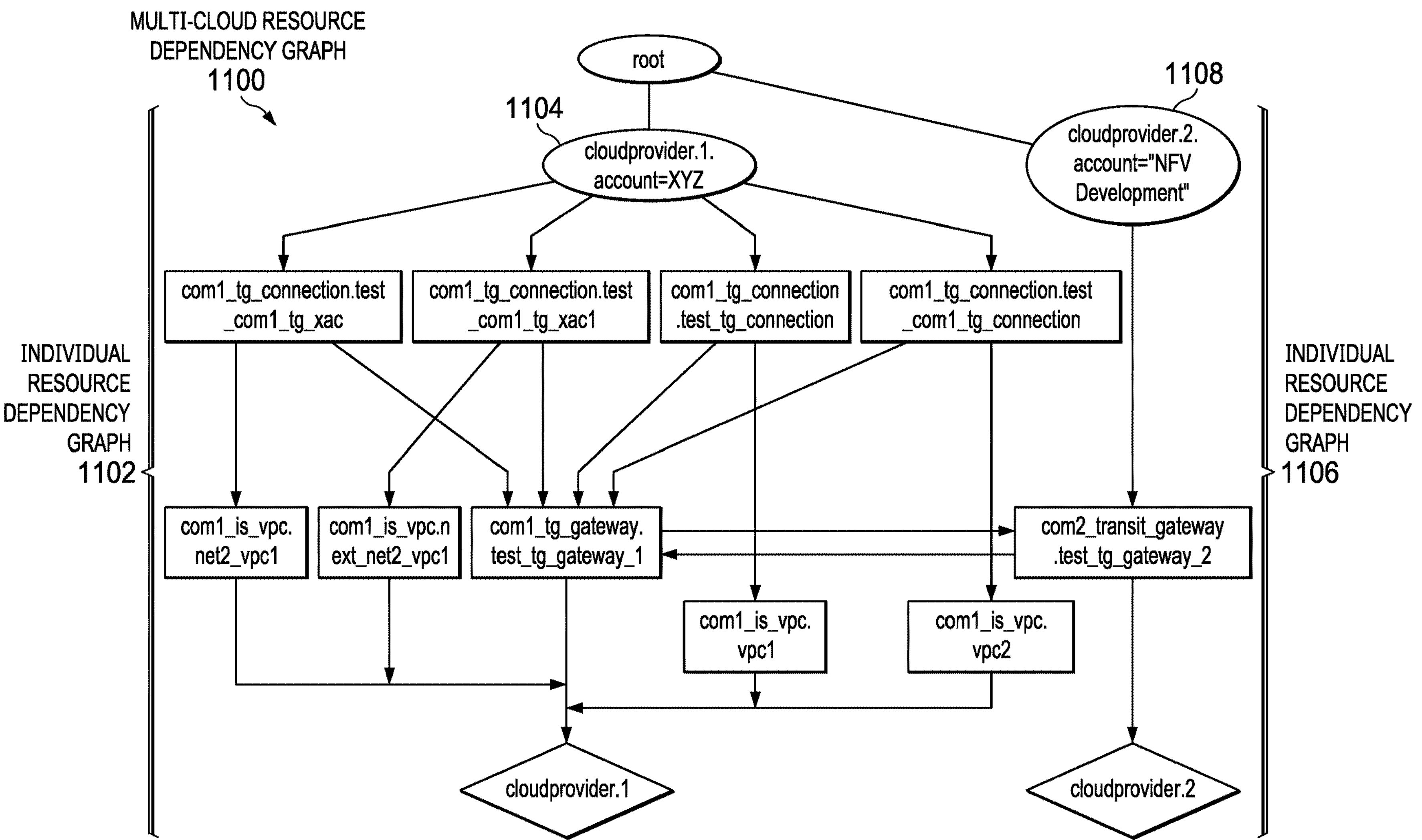
FIG. 11 is a diagram illustrating an example of a multi-cloud resource dependency graph in accordance with an illustrative embodiment.

With reference now to FIG. 11, a diagram illustrating an example of a multi-cloud resource dependency graph is depicted in accordance with an illustrative embodiment. Multi-cloud resource dependency graph 1100 may be implemented in a multi-cloud resource dependency graph manager, such as, for example, multi-cloud resource dependency graph manager 514 in FIG. 5.

Multi-cloud resource dependency graph 1100 represents a single consolidated resource dependency graph, such as, for example, consolidated multi-cloud resource dependency graph 516 in FIG. 5, corresponding to a multi-cloud infrastructure comprised of a plurality of clouds that are associated with different cloud providers. The multi-cloud resource dependency graph manager combines or merges all the individual cloud account configurations (i.e., individual resource dependency graph 1102 corresponding to cloud provider1 account "XYZ" 1104 and individual resource dependency graph 1106 corresponding to cloud provider2 account "NFV Development" 1108) to generate multi-cloud resource dependency graph 1100. Individual resource dependency graph 1102 and individual resource dependency graph 1106 may be, for example, individual cloud resource dependency graph 518 and individual cloud resource dependency graph 524 in FIG. 5. The multi-cloud resource dependency graph manager consolidates individual resource dependency graph 1102 and individual resource dependency graph 1106 by referring to cloud resource names, which are unique across the entire multi-cloud infrastructure, corresponding to respective resource types. A multi-cloud resource deployment error analyzer, such as, for example, multi-cloud resource deployment error analyzer 530 in FIG. 5, searches and analyzes the nodes of multi-cloud resource dependency graph 1100 to detect cloud resource redundancy and conflicts in the multi-cloud infrastructure.

As an illustrative example, a customer wants to utilize a first cloud (cloud1) corresponding to a first cloud provider (cloud provider1) and a second cloud (cloud2) corresponding to a second cloud provider (cloud provider2) in the multi-cloud infrastructure. The customer wants to configure a high availability virtual private cloud on cloud1 corresponding to cloud provider1 and on cloud2 corresponding to cloud provider2. The customer also wants each of these virtual private clouds in cloud1 and cloud2 to have a virtual server instance (virtual machine virtual server instance). The customer further wants both of the virtual server instances to communicate between cloud1 and cloud2 using a high availability virtual private network gateway configuration. The virtual private network connects the customer's on-premise network to the virtual private cloud in the public cloud using the Internet. In a virtual private network gateway connection, 2 virtual private network tunnels exist. However, these tunnels are of no use when the endpoints are in the same subnet range (i.e., both on-premise network and virtual private cloud network are in the same network range). Because both the on-premise and virtual private cloud networks use the same internal internet protocol addresses, it is not possible to build a tunnel between these two networks.

An illustrative example of how to check this high availability virtual private network gateway configuration for conflicting resources follows. The DevOPs administrator should configure the virtual private network gateways of cloud1 and cloud2 with autonomous system numbers that are different from each other and should not conflict with each other. For example, the DevOPs administrator may configure cloud1 to have the autonomous system number of 65001 and cloud2 to have the autonomous system number of 65002. In addition, the DevOPs administrator should configure the virtual private network tunnel subnets of both cloud1 and cloud2 to be different and not conflicting.

In this example, the parent resource is the virtual private network gateway and the virtual private network gateway connections are the sibling resources. The DevOps administrator defines the virtual private network gateway connections to have attributes of tunnel and subnet. Each of the virtual private network gateways has virtual private network gateway connections that will have a dependency with cloud1 and cloud2. The conflict( ) method will compare the attributes (i.e., tunnel and subnet) of the virtual private network gateway connections with other sibling resources. If the attributes of sibling resources are different, then the tunnel subnet ranges should be different and should not result in a conflict. An illustrative example of the conflict( ) method is as follows:

```
Conflict( ) {
a. call equals( ) method, find if the virtual private network gateway
connections are same. If same, inform user that the virtual private network
gateway connections are redundant.
b. If virtual private network gateway connections are different, then
compare subnet range.
c. If there is a conflict/overlap with subnet ranges, inform the user
regarding conflicting resources.
}.
```

When sibling resources are found to have interdependency with other clouds within the multi-cloud infrastructure, then the multi-cloud resource deployment error analyzer compares the immediate parent resource nodes as well. In this example, the multi-cloud resource deployment error analyzer compares and verifies whether the autonomous system number is the same for the parent resource of the connections which is cloud1 virtual private network and cloud2 virtual private network. If the autonomous system numbers are the same, then inform the infrastructure administrator regarding the conflicting virtual private network gateways.

It should be noted that the DevOps administrator can set an error percentage threshold level for redundancy and conflict errors in order for illustrative embodiments to prevent or disallow the infrastructure administrator from deploying certain resources in the multi-cloud infrastructure until the percentage of errors is below the set error percentage threshold level. The DevOps administrator can also fine-tune a software configuration file to find the errors from various checker modules, such as, for example, redundancy checker 536 and conflict checker 538 in FIG. 5. Illustrative embodiments can also certify that the multi-cloud infrastructure is a high available multi-cloud infrastructure when a resource redundancy percentage of that particular multi-cloud infrastructure is above a predefined minimum resource redundancy percentage threshold level. In addition, illustrative embodiments can also certify different cloud services corresponding to the multi-cloud infrastructure based on the resource error percentage.

Figure 12A:
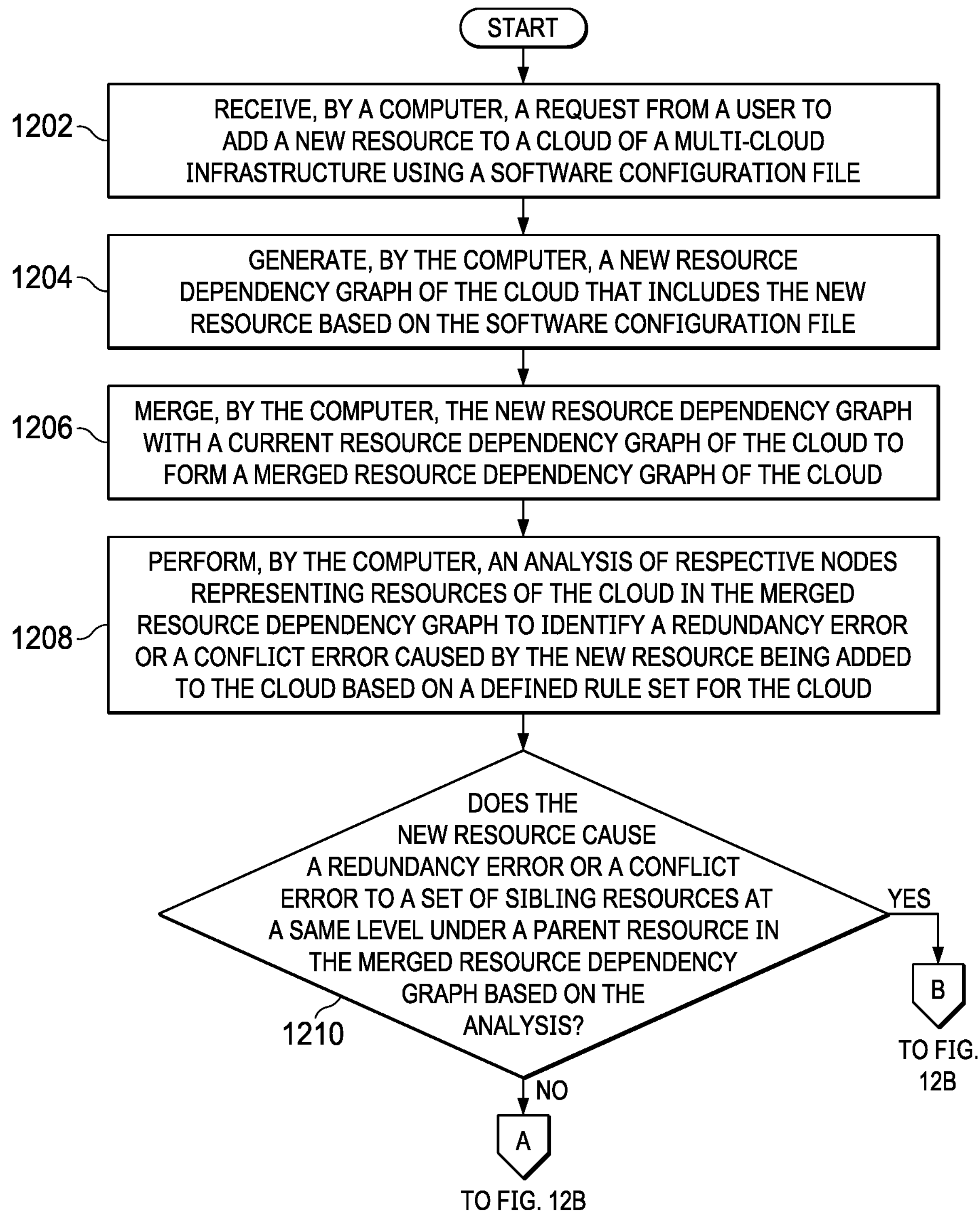
FIGS. 12A-12B are a flowchart illustrating a process for multi-cloud resource management in accordance with an illustrative embodiment.
Figure 12B:
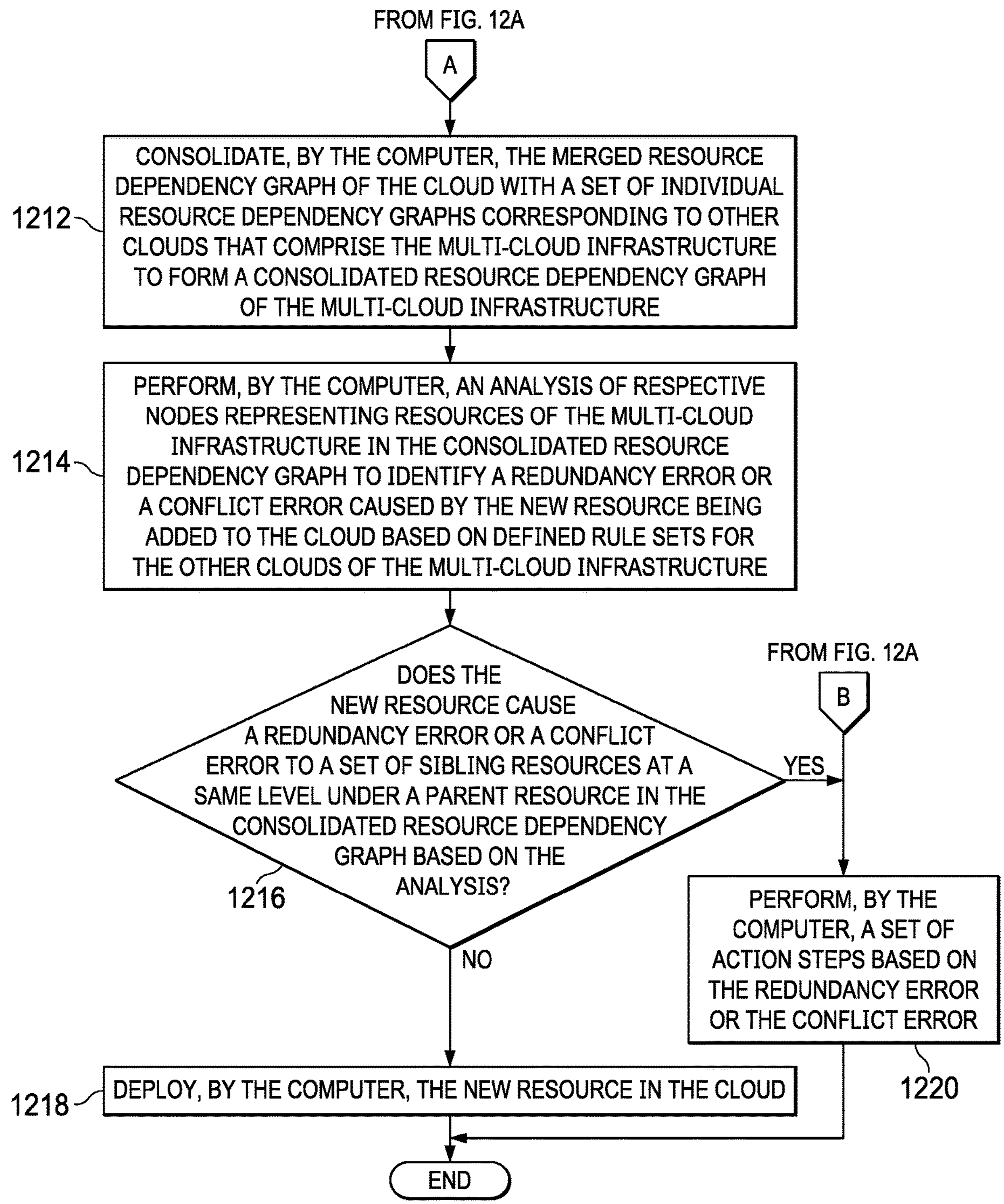

With reference now to FIGS. 12A-12B, a flowchart illustrating a process for multi-cloud resource management is shown in accordance with an illustrative embodiment. The process shown in FIGS. 12A-12B may be implemented in a computer, such as, for example, server 104 in FIG. 1 or data processing system 200 in FIG. 2. For example, the process shown in FIGS. 12A-12B may be implemented in multi-cloud resource manager 218 in FIG. 2.

The process begins when the computer receives a request from a user to add a new resource to a cloud of a multi-cloud infrastructure using a software configuration file (step 1202). The computer generates a new resource dependency graph of the cloud that includes the new resource based on the software configuration file (step 1204). The computer merges the new resource dependency graph with a current resource dependency graph of the cloud to form a merged resource dependency graph of the cloud (step 1206).

The computer performs an analysis of respective nodes representing respective resources of the cloud in the merged resource dependency graph to identify a redundancy error or a conflict error caused by the new resource being added to the cloud based on a defined rule set for the cloud (step 1208). The computer makes a determination as to whether the new resource causes a redundancy error or a conflict error to a set of sibling resources at a same level under a parent resource in the merged resource dependency graph based on the analysis (step 1210).

If the computer determines that the new resource does cause a redundancy error or a conflict error to a set of sibling resources at a same level under a parent resource in the merged resource dependency graph based on the analysis, yes output of step 1210, then the process proceeds to step 1220. If the computer determines that the new resource does not cause a redundancy error or a conflict error to a set of sibling resources at a same level under a parent resource in the merged resource dependency graph based on the analysis, no output of step 1210, then the computer consolidates the merged resource dependency graph of the cloud with a set of dependency graphs corresponding to one or more other clouds that comprise the multi-cloud infrastructure to form a consolidated resource dependency graph of the multi-cloud infrastructure (step 1212).

The computer performs an analysis of respective nodes representing respective resources of the multi-cloud infrastructure in the consolidated resource dependency graph to identify a redundancy error or a conflict error caused by the new resource being added to the cloud based on defined rule sets for the one or more other clouds of the multi-cloud infrastructure (step 1214). The computer makes a determination as to whether the new resource causes a redundancy error or a conflict error to a set of sibling resources at a same level under a parent resource in the consolidated resource dependency graph based on the analysis (step 1216).

If the computer determines that the new resource does not cause a redundancy error or a conflict error to a set of sibling resources at a same level under a parent resource in the consolidated resource dependency graph based on the analysis, no output of step 1216, then the computer deploys the new resource in the cloud of the multi-cloud infrastructure (step 1218). Thereafter, the process terminates. If the computer determines that the new resource does cause a redundancy error or a conflict error to a set of sibling resources at a same level under a parent resource in the consolidated resource dependency graph based on the analysis, yes output of step 1216, then the computer performs a set of action steps based on the redundancy error or the conflict error (step 1220). The set of action steps may include, for example, notifying an infrastructure administrator of the resource error, automatically removing or correcting the resource error, and the like. Thereafter, the process terminates.

Thus, illustrative embodiments of the present invention provide a computer-implemented method, computer system, and computer program product for detecting resource redundancy and conflict errors in a multi-cloud infrastructure comprised of a plurality of clouds corresponding to different cloud providers using a single consolidated multi-cloud resource dependency graph. For example, illustrative embodiments enable a user, such as, for example, a DevOps administrator, to specify custom rules and extensions to detect errors in the multi-cloud infrastructure. In addition, illustrative embodiments enable a cloud provider to write code in the software configuration file for detecting resource redundancy and conflicts in the multi-cloud infrastructure. Illustrative embodiments also enable the cloud provider to utilize a declarative approach where the cloud provider can specify rules on a per resource type basis for when sibling resources are redundant and when sibling resources are conflicting. As a result, illustrative embodiments capable of detecting any kind of resource errors in the multi-cloud infrastructure prior to resource deployment and then performing steps, such as, for example, informing the user regarding dominating and suppressed resources, automatically removing suppressed resources, and the like, to reduce multi-cloud infrastructure cost and increase performance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting resource errors in a heterogeneous computing environment, the computer-implemented method comprising:

consolidating, by a computer, a plurality of individual resource dependency graphs corresponding to a plurality of computing systems that comprise the heterogeneous computing environment to form a consolidated resource dependency graph of the heterogeneous computing environment;

performing, by the computer, an analysis of respective nodes representing respective resources of the heterogeneous computing environment in the consolidated resource dependency graph to identify a resource error caused by a new resource being added to a computing system of the plurality of computing systems that comprise the heterogeneous computing environment based on defined rule sets for the plurality of computing systems;

determining, by the computer, whether the new resource causes a resource error to a set of sibling resources at a same level under a parent resource in the consolidated resource dependency graph based on the analysis; and responsive to the computer determining that the new resource does not cause a resource error to the set of sibling resources at the same level under the parent resource in the consolidated resource dependency graph based on the analysis, deploying, by the computer, the new resource in the computing system of the heterogeneous computing environment.

2. The computer-implemented method of claim 1 further comprising:

responsive to the computer determining that the new resource does cause the resource error to the set of sibling resources at the same level under the parent resource in the consolidated resource dependency graph based on the analysis, performing, by the computer, a set of action steps automatically based on the resource error.

3. The computer-implemented method of claim 2, wherein the set of action steps includes one or more of notifying a user of the resource error, automatically removing the resource error, and automatically correcting the resource error.

4. The computer-implemented method of claim 1 further comprising:

receiving, by the computer, a request from a user to add the new resource to the computing system of the plurality of computing systems that comprise heterogeneous computing environment using a software configuration file;

generating, by the computer, a new resource dependency graph of the computing system that includes the new resource based on the software configuration file;

merging, by the computer, the new resource dependency graph with a current resource dependency graph of the computing system to form a merged resource dependency graph of the computing system; and performing, by the computer, an analysis of respective nodes representing respective resources of the computing system in the merged resource dependency graph to identify a particular error caused by the new resource being added to the computing system based on a defined rule set for the computing system.

5. The computer-implemented method of claim 4, wherein the software configuration file is one of Infrastructure as Code, shell scripts, or automation code.

6. The computer-implemented method of claim 1, wherein the computer performs the analysis of the respective nodes representing the respective resources of the heterogeneous computing environment in the consolidated resource dependency graph prior to the new resource being deployed in the computing system of the heterogeneous computing environment.

7. The computer-implemented method of claim 1, wherein the heterogeneous computing environment is a multi-cloud infrastructure comprised of a plurality of clouds corresponding to different cloud providers.

8. The computer-implemented method of claim 7, wherein the computer prevents deployment of resources in the multi-cloud infrastructure until a percentage of errors is below a set error percentage threshold level for resource errors.

9. The computer-implemented method of claim 1, wherein the resource error is one of a resource redundancy error and a resource conflict error.

10. The computer-implemented method of claim 9, wherein the computer detects the resource redundancy error by comparing attributes of the new resource with attributes of the set of sibling resources at the same level under the parent resource in the consolidated resource dependency graph.

11. The computer-implemented method of claim 9, wherein the computer detects the resource redundancy error using an equals( ) method.

12. The computer-implemented method of claim 9, wherein the computer detects the resource conflict error by comparing attributes of the new resource with attributes of the set of sibling resources at the same level under the parent resource in the consolidated resource dependency graph.

13. The computer-implemented method of claim 9, wherein the computer detects the resource conflict error using a conflict( ) method.

14. The computer-implemented method of claim 1, wherein the new resource is one of a gateway, connection, or security group rule corresponding to the computing system.

15. A computer for detecting resource errors in a heterogeneous computing environment, the computer comprising:

a bus system;

a storage device connected to the bus system, wherein the storage device stores program instructions; and a processor connected to the bus system, wherein the processor executes the program instructions to:

consolidate a plurality of individual resource dependency graphs corresponding to a plurality of computing systems that comprise the heterogeneous computing environment to form a consolidated resource dependency graph of the heterogeneous computing environment;

perform an analysis of respective nodes representing respective resources of the heterogeneous computing environment in the consolidated resource dependency graph to identify a resource error caused by a new resource being added to a computing system of the plurality of computing systems that comprise the heterogeneous computing environment based on defined rule sets for the plurality of computing systems;

determine whether the new resource causes a resource error to a set of sibling resources at a same level under a parent resource in the consolidated resource dependency graph based on the analysis; and deploy the new resource in the computing system of the heterogeneous computing environment in response determining that the new resource does not cause a resource error to the set of sibling resources at the same level under the parent resource in the consolidated resource dependency graph based on the analysis.

16. The computer of claim 15, wherein the processor further executes the program instructions to:

perform a set of action steps automatically based on the resource error in response to determining that the new resource does cause the resource error to the set of sibling resources at the same level under the parent resource in the consolidated resource dependency graph based on the analysis.

17. The computer of claim 15, wherein the processor further executes the program instructions to:

receive a request from a user to add the new resource to the computing system of the plurality of computing systems that comprise heterogeneous computing environment using a software configuration file;

generate a new resource dependency graph of the computing system that includes the new resource based on the software configuration file;

merge the new resource dependency graph with a current resource dependency graph of the computing system to form a merged resource dependency graph of the computing system; and perform an analysis of respective nodes representing respective resources of the computing system in the merged resource dependency graph to identify a particular error caused by the new resource being added to the computing system based on a defined rule set for the computing system.

18. A computer program product for detecting resource errors in a heterogeneous computing environment, the computer program product comprising a computer-readable storage medium having program instructions embodied therewith, the program instructions executable by a computer to cause the computer to perform a method of:

consolidating, by the computer, a plurality of individual resource dependency graphs corresponding to a plurality of computing systems that comprise the heterogeneous computing environment to form a consolidated resource dependency graph of the heterogeneous computing environment;

performing, by the computer, an analysis of respective nodes representing respective resources of the heterogeneous computing environment in the consolidated resource dependency graph to identify a resource error caused by a new resource being added to a computing system of the plurality of computing systems that comprise the heterogeneous computing environment based on defined rule sets for the plurality of computing systems;

determining, by the computer, whether the new resource causes a resource error to a set of sibling resources at a same level under a parent resource in the consolidated resource dependency graph based on the analysis; and responsive to the computer determining that the new resource does not cause a resource error to the set of sibling resources at the same level under the parent resource in the consolidated resource dependency graph based on the analysis, deploying, by the computer, the new resource in the computing system of the heterogeneous computing environment.

19. The computer program product of claim 18 further comprising:

responsive to the computer determining that the new resource does cause the resource error to the set of sibling resources at the same level under the parent resource in the consolidated resource dependency graph based on the analysis, performing, by the computer, a set of action steps automatically based on the resource error.

20. The computer program product of claim 18 further comprising:

receiving, by the computer, a request from a user to add the new resource to the computing system of the plurality of computing systems that comprise heterogeneous computing environment using a software configuration file;

generating, by the computer, a new resource dependency graph of the computing system that includes the new resource based on the software configuration file;

merging, by the computer, the new resource dependency graph with a current resource dependency graph of the computing system to form a merged resource dependency graph of the computing system; and performing, by the computer, an analysis of respective nodes representing respective resources of the computing system in the merged resource dependency graph to identify a particular error caused by the new resource being added to the computing system based on a defined rule set for the computing system.

* * * * *